(12) United States Patent
Charny et al.

(10) Patent No.: US 7,848,249 B1
(45) Date of Patent: Dec. 7, 2010

(54) METHOD FOR COMPUTING FRR BACKUP TUNNELS USING AGGREGATE BANDWIDTH CONSTRAINTS

(75) Inventors: Anna Charny, Sudbury, MA (US); Hani El-Sakkout, London (GB); Barry Richards, Northbourne (GB)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 12/218,308

(22) Filed: Jul. 14, 2008

Related U.S. Application Data

(63) Continuation-in-part of application No. 10/262,296, filed on Sep. 30, 2002, now Pat. No. 7,418,493.

(51) Int. Cl.
*H04L 12/24* (2006.01)
(52) U.S. Cl. .................................................... 370/252
(58) Field of Classification Search ........................ None
See application file for complete search history.

(56) References Cited

U.S. PATENT DOCUMENTS

| | | | |
|---|---|---|---|
| 5,020,052 A | 5/1991 | DePrycker et al. | |
| 5,717,796 A | 2/1998 | Clendening | |
| 5,850,505 A | 12/1998 | Grover et al. | |
| 5,856,981 A | 1/1999 | Voelker | |
| 6,023,452 A | 2/2000 | Shiragaki | |
| 6,229,787 B1 | 5/2001 | Byrne | |
| 6,246,667 B1 | 6/2001 | Ballintine et al. | |
| 6,778,492 B2 | 8/2004 | Charny et al. | |
| 6,895,441 B1 * | 5/2005 | Shabtay et al. | 709/238 |
| 6,904,018 B2 | 6/2005 | Lee et al. | |
| 6,978,394 B1 * | 12/2005 | Charny et al. | 714/4 |
| 2002/0067693 A1 | 6/2002 | Kodialam et al. | |
| 2002/0097671 A1 * | 7/2002 | Doverspike et al. | 370/216 |
| 2002/0112072 A1 | 8/2002 | Jain | |
| 2003/0002444 A1 | 1/2003 | Shin et al. | |
| 2003/0009582 A1 | 1/2003 | Qiao et al. | 709/233 |
| 2003/0126287 A1 | 7/2003 | Charny et al. | 709/239 |

OTHER PUBLICATIONS

Chen et al, Fault Restoration Techniques for MPLS with QoS Constraints, Southern Methodist University, 23 pages, Aug. 2000.*
R. Braden et al."Resource ReSerVation Protocol (RSVP)—Version 1 Functional Specification,"RFC 2205, Internet Engineering Task Force, Sep. 1997.
D. Awduche, et al. "Requirements for Traffic Engineering Over MPLS," RFC 2702, Internet Engineering Task Force, Sep. 1999.
E. Rosen, et al. "Multiprotocol Label Switching Architecture," RFC 3031, Internet Engineering Task Force, Jan. 2001.
D. Gan, et al. "A Method for MPLS LSP Fast-Reroute Using RSVP Detours," Internet Draft, Internet Engineering Task Force, Apr. 2001.
J.P. Lang, et al Generalized MPLS Recovery Mechanisms, Internet Draft, Internet Engineering Task Force, Jun. 2001.
P. Ashwood-Smith, et al. Generalized MPLS Signaling—RSVP-TE Extensions, Internet Draft, Internet Engineering Task Force, Oct. 2001.
Pan, et al, "Fast Reroute Techniques in RSVP-TE, "Internet Draft, Internet Engineering Task Force, Nov. 2001.
F. LeFauchear, et al. "Requirements for Support of Diff-Serv-aware MPLS Traffic Engineering, " Internet Draft, Internet Engineering Task Force, Nov. 2001.

* cited by examiner

*Primary Examiner*—Frank Duong
(74) *Attorney, Agent, or Firm*—Cindy Kaplan

(57) ABSTRACT

Systems and methods for estimating aggregate bandwidths of primary traffic flows are provided. Tighter upper bounds on aggregate bandwidths for arbitrary combinations of primary traffic flows may be computed. These tighter bounds are highly useful in configuring backup tunnels to protect a node in the event of failure in that the total backup bandwidth burden on individual links may be determined more accurately to permit optimal use of available backup bandwidth capacity.

18 Claims, 4 Drawing Sheets

METHOD FOR COMPUTING FRR BACKUP TUNNELS USING AGGREGATE BANDWIDTH CONSTRAINTS

STATEMENT OF RELATED APPLICATIONS

The present application is a divisional of U.S. patent application Ser. No. 10/262,296, filed Sep. 30, 2002, the contents of which are incorporated by reference herein for all purposes.

The present application is related to the subject matter of the following patents and pending patent applications:

U.S. Pat. No. 6,978,394 entitled "LINEAR PROGRAM-BASED TECHNIQUE FOR PLACING FRR TE TUNNELS WITH BANDWIDTH GUARANTEE," filed on Feb. 22, 2002;

U.S. patent application Ser. No. 10/038,259 entitled "IMPLICIT SHARED BANDWIDTH PROTECTION FOR FAST REROUTE," filed on Jan. 2, 2002;

U.S. Pat. No. 6,778,492 entitled "LOAD BALANCING FOR FAST REROUTE BACKUP TUNNELS," filed on Jan. 17, 2002;

U.S. Pat. No. 7,230,913 entitled "MPLS FAST REROUTE WITHOUT FULL MESH TRAFFIC ENGINEERING," filed on Jun. 11, 2002; and U.S. patent application Ser. No. 10/171,395 entitled "DISTINGUISHING BETWEEN LINK AND NODE FAILURE TO FACILITATE FAST REROUTE," filed on Jun. 12, 2002.

The contents of the above-identified applications are incorporated by reference herein in their entirety for all purposes.

BACKGROUND OF THE INVENTION

The present application relates to data networking and more particularly to systems and methods for rerouting around failed links and/or nodes.

In the following, "link" generally refers to a network cable and/or connecting interface, and "node" generally refers to a router, switch or other network device connected to other nodes by links.

The Internet and IP networks in general have become key enablers to a broad range of business, government, and personal activities. More and more, the Internet is being relied upon as a general information appliance, business communication tool, entertainment source, and as a substitute for traditional telephone networks and broadcast media. As the Internet expands its role, users become more and more dependent on uninterrupted access.

To assure rapid recovery in the event of failure of a network link or node, so-called "Fast Reroute" techniques have been developed. In a network employing Fast Reroute, traffic flowing through a failed link or node is rerouted through one or more preconfigured backup tunnels. Redirection of the impacted traffic occurs very quickly to minimize impact on the user experience, typically in tens of milliseconds.

These Fast Reroute techniques have been developed in the context of MPLS Traffic Engineering where traffic flows through label switched paths (LSPs). Typically, the overall network is configured such that traffic flows through guaranteed bandwidth end-to-end "primary" LSPs. It is also possible to establish short primary LSPs in a non-Traffic Engineering network, only for the purpose of taking advantage of Fast Reroute techniques (see above-referenced patent application entitled "MPLS Reroute Without Full Mesh Traffic Engineering.")

In either case, when a link or node failure occurs, traffic affected by the failure is rerouted to the preconfigured backup tunnels. These backup tunnels are typically (but not necessarily) used only for a very short time since simultaneously with the rerouting through the backup tunnels, the head ends of all affected primary LSPs are notified of the failure. This causes the head ends to reroute the primary LSPs around the failures so that, if the rerouting is successful, the backup tunnels are no longer needed. It is generally assumed that the probability of multiple failures in such a short time is small, so each failure may be considered independently.

Under the independent failure assumption, link bandwidth available for backup tunnels may be shared between backup tunnels protecting different links or nodes. The techniques disclosed in U.S. patent application Ser. No. 10/038,259 make use of this assumption to allow available backup bandwidth to be shared among links or nodes to be protected while assuring that guaranteed bandwidth requirements continue to be met during Fast Reroute conditions.

During network operation, primary LSPs will be established and torn down. To avoid the need to constantly reconfigure backup tunnels in response to changes in primary LSPs, it is advantageous to configure the backup tunnel(s) protecting a network element to accommodate the maximum bandwidth reservable for primary LSPs using that element.

Consider a node to be protected. The traffic burden to be protected will consist of a set of "primary traffic flows." Each primary traffic flow consists of primary LSPs that can cross the protected node via a pair of links, one link to the protected node and another link away from the protected node. One or more backup tunnels will be established to protect each such link pair. Each backup tunnel consists of a sequence of one or more links defining the sequence of links it traverses. For each link, the total traffic burden of the primary traffic flows protected by backup tunnels that include (i.e. traverse) the link should not exceed the reservable backup bandwidth of the link.

It is thus necessary to identify a maximum primary traffic bandwidth for aggregates of primary traffic flows. A straightforward approach is to simply take the sum of the bandwidths of individual flows in the aggregate. As will be shown herein, however, this approach often results in an inflated estimate of the aggregate bandwidth to be protected by backup tunnels traversing a given link. The consequences of the exaggerated bandwidth estimates can include inefficient configuration of backup tunnels and even failure to find backup tunnels.

What is needed are improved systems and methods for estimating the total bandwidths of aggregates of primary traffic flows traversing a node to be protected.

SUMMARY OF THE INVENTION

By virtue of one embodiment of the present invention, improved systems and methods for estimating aggregate bandwidths of primary traffic flows are provided. Tighter upper bounds on aggregate bandwidths for arbitrary combinations of primary traffic flows may be computed. These tighter bounds are highly useful in configuring backup tunnels to protect a node in the event of failure in that the total backup bandwidth burden on individual links may be determined more accurately to permit optimal use of available backup bandwidth capacity.

A first aspect of the present invention provides a method for deducing upper bounds on aggregate flows that pass through a node undergoing protection that are tighter than those obtained by summing the upper bandwidth bounds of individual flows, the method including the deduction of such tighter upper bounds by inspecting the primary bandwidth capacities of links adjoining the node undergoing protection, and exploiting the knowledge that these capacities are known to limit the maximum bandwidth of the aggregate flows under consideration.

A second aspect of the present invention provides a method for estimating an upper bound of a bandwidth protected by one or more backup tunnels passing through a link. The method includes: defining constraints on an aggregate flow protected by the one or more backup tunnels and maximizing the aggregate flow under the constraints to determine the upper bound.

Further understanding of the nature and advantages of the inventions herein may be realized by reference to the remaining portions of the specification and the attached drawings.

DESCRIPTION OF SPECIFIC EMBODIMENTS

Figure 2:
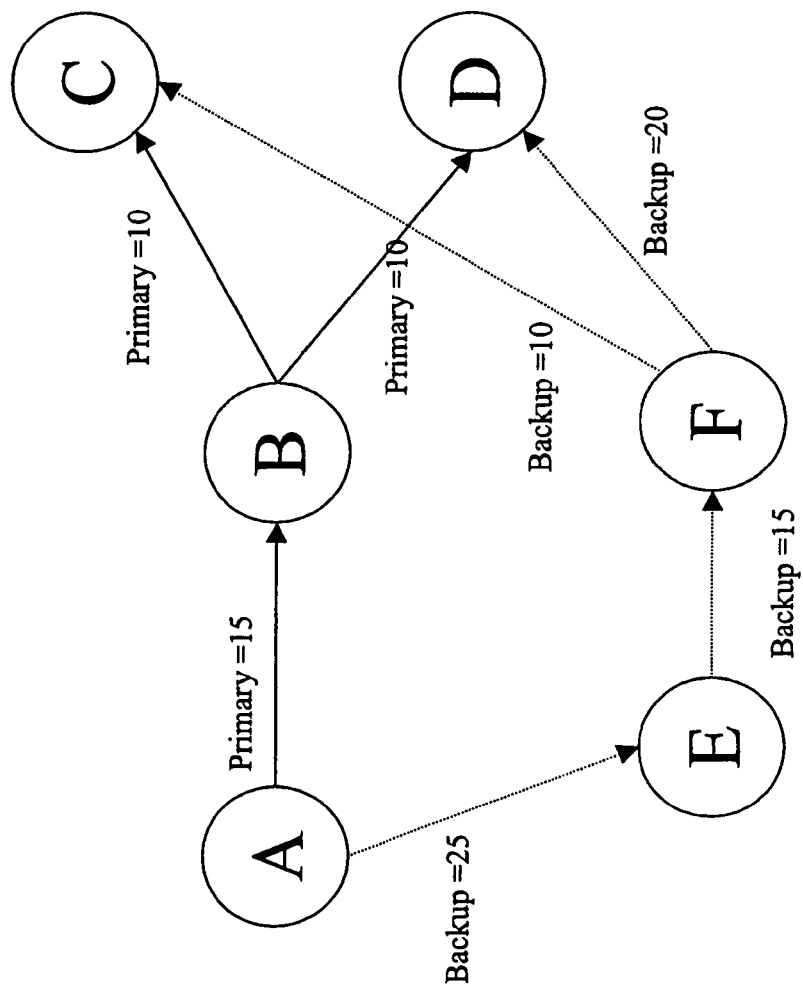
FIG. 2 depicts a network configuration useful in illustrating embodiments of the present invention.

The present invention will be described with reference to a representative network environment that uses a particular representative combination of protocols to move data through the network. FIG. 2 depicts a particular configuration of network nodes in such an environment. The network nodes are interconnected by links may be implemented using any type of physical medium such as e.g., an optical medium, a wireless medium, twisted pair, etc.

In one embodiment, the nodes of FIG. 2 interoperate in a manner specified by various protocols including, e.g., TCP/IP as known in the art, suitable link layer protocols such as Link Management Protocol (LMP), and protocols defined by the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling—RSVP-TE Extensions," Internet Draft, Internet Engineering Task Force, October 2001.

Pan, et al., "Fast Reroute Techniques in RSVP-TE," Internet Draft, Internet Engineering Task Force, October 2001.

The contents of the above documents are herein incorporated by reference in their entirety for all purposes.

In one embodiment, the nodes of FIG. 2 are IP routers that implement multiprotocol label switching (MPLS) and essentially operate as label switched routers (LSRs). The nodes of FIG. 2 may also implement MPLS Traffic Engineering (MPLS TE) and/or Diffserv-Aware Traffic Engineering. Traffic flows through end-to-end LSPs that are configured to offer guaranteed bandwidth, latency, jitter, etc. This type of environment is, however, merely representative. Embodiments of the present invention are applicable regardless of the properties of traffic carried across the network.

When a given LSP in a network employing MPLS TE experiences a node or link failure, the head-end, i.e., the ingress, will establish a new LSP as a substitute. However, this process requires far longer than desirable. Accordingly, a local fast reroute capability is provided so that when a node or a link fails, an LSP is temporarily rerouted around the failed link or node while a new end-to-end LSP is being established at the head-end.

Each node is protected by one or more backup tunnels that do not include the protected node. Referring now to FIG. 2, details of the backup protection scheme can be seen. Node B is the node to be protected. To protect node B, one protects the "primary traffic flows" through node B. Each primary traffic flow is understood to include all the primary LSPs passing through a pair of links that traverse node B. Here one primary traffic flow, ABC, passes through links AB and BC. Another primary traffic flow, ABD, passes through nodes AB and BD.

Each link has an associated primary bandwidth and an associated backup bandwidth. The primary bandwidth is the amount of bandwidth in a bandwidth pool that is reserved for bandwidth-guaranteed primary LSPs crossing the link. The backup bandwidth on a link is the amount of bandwidth in a bandwidth pool that is made available after a failure for any backup tunnels that divert traffic over the link.

Each primary traffic flow through a node is protected by one or more backup tunnels. When a node fails, the backup tunnels for that node need to protect enough bandwidth to meet the bandwidth guarantees for the LSPs in the primary bandwidth pools. The backup tunnels should be placed so that they do not need to be updated when primary LSPs are rerouted. An important part of placing the backup tunnels is then assuring that they do not impose an excessive backup bandwidth burden on any particular link. To compute the backup bandwidth burden on a link, one would determine an aggregate bandwidth to be protected by the backup tunnels on the link based on the bandwidths of primary traffic flows protected by those backup tunnels.

The question then is how much bandwidth needs to be protected on a given aggregate of primary traffic flows. Consider the situation in FIG. 2. The primary traffic flow on ABC has no more than 10 units of bandwidth, the minimum of the traffic flows of the constituent links AB and BC. Similarly, the primary traffic flow on ABD has no more than 10 units of bandwidth. By adding these bandwidths together, one gets an upper bound of 20. Thus a backup tunnel protecting both ABC and ABD may include (traverse) links with backup bandwidth of 20 or greater and provide guaranteed bandwidth. It would be desirable to include link EF in backup tunnels protecting both primary traffic flows. However, link EF's backup bandwidth of 15 would seem to be insufficient given an upper bound of 20 for the aggregate primary flow bandwidth.

By virtue of the present invention, however, tighter bounds on aggregate primary flow bandwidth may be obtained by a more careful analysis of aggregate bandwidth requirements. Referring again to FIG. 2, it can be deduced that the aggregate traffic bandwidth resulting from combining primary traffic flows ABC and ABD can be no more than 15 because they share a link AB which has a primary bandwidth of 15 units. Thus link EF can be part of both a backup tunnel AEFC that protects primary traffic flow ABC and a backup tunnel AEFD that protects primary traffic flow ABD.

The type of deductive reasoning that was used to tighten the upper bound on aggregate primary flow bandwidth is referred to herein as "flow bandwidth inference." Flow bandwidth inference is defined to mean the deduction of upper bandwidth bounds for arbitrary combinations of the diverted primary traffic flows, using as input to the deduction process the primary bandwidths of the links adjacent to the protected router.

In the basic case, the sum of the bandwidth bounds deduced for individual primary traffic flows can be used as an upper bandwidth bound for aggregate flows. This basic case is not considered to be "flow bandwidth inference" in the context of this document. However, if an upper bandwidth bound for an aggregate flow is derived from the primary bandwidths of the links adjacent to the node, and this bound is lower than the sum of bounds inferred for individual flows, the inference process used is deemed to be a form of "flow bandwidth inference".

The use of the flow bandwidth inference can result in tighter bounds than the ones obtained by simple summation, and in many cases the bounds are significantly tighter. Investigations of backup tunnel placement problems where nodes are traversed by hundreds or thousands of flows show that the use of flow bandwidth inference techniques is more complex but highly beneficial. For many protection problems, the reduction in aggregate bandwidth bounds represents the difference between successful placement of backup tunnels and failure to find protection.

Figure 3:
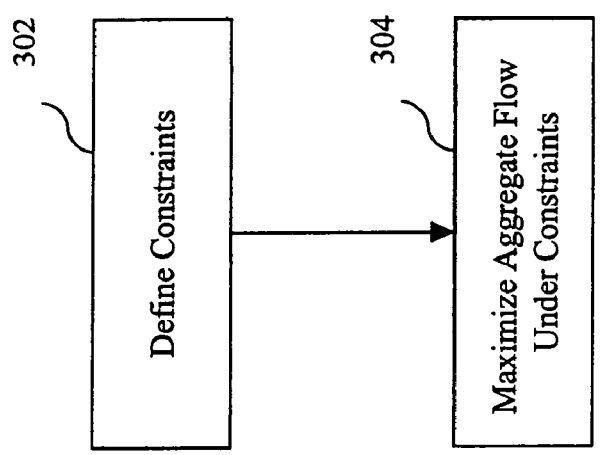
FIG. 3 is a flowchart describing steps of evaluating aggregate bandwidth of primary traffic flows according to one embodiment of the present invention.

The flow bandwidth inference may in the best case be exploited to find the tightest possible upper bandwidth bound for an aggregate of an arbitrary subset of primary traffic flows. The upper bandwidth bound may be computed as a flow maximization problem where each primary traffic flow is represented by a flow variable, and these flow variables are subject to linear constraints that capture the primary bandwidth limits on the links adjacent to the protected node. An optimization procedure maximizes the sum of the flow variables that correspond to the primary traffic flows in the selected subset. The result of this maximization is the tightest possible upper bound for the aggregate bandwidth of the subset's primary traffic flows. This optimization process is referred to as "aggregate bandwidth optimization." Note that the use of "flow bandwidth inference" represents a broader class of techniques that includes, but is not limited to, optimization processes referred to here as "aggregate bandwidth optimization". However "aggregate bandwidth optimization" is of particular interest since it obtains the tightest upper bound, and is used here as a specific illustration of a "flow bandwidth inference" procedure. FIG. 3 is a flowchart generally describing steps of performing aggregate bandwidth optimization. First constraints are defined at step 302. Then a flow maximization process is applied to maximize the aggregate flow under these constraints at step 304. For example, the well-known Simplex method or its variants may be employed to solve this linear programming problem.

A detailed mathematical definition of the "aggregate bandwidth optimization" problem will be presented below. Informally, the constraints of this flow maximization problem may be listed as follows. For an aggregate of primary traffic flows through a protected node:

1. All of the individual primary traffic flows have bandwidth greater than or equal to zero.
2. For all nodes adjoining the protected node, a sum of bandwidths of flows leaving the adjoining node is less than or equal to a primary bandwidth of the link connecting the adjoining node and the protected node.
3. For all nodes adjoining the protected node a sum of bandwidths of flows arriving at the adjoining node is less than or equal to a primary bandwidth of the link connecting the adjoining node and the protected node.

The aggregate of primary traffic flows is maximized under these constraints to find the least upper bound.

More formally:

The network is modeled as a directed graph where the links are arcs.

Given a directed graph, with a set of nodes N and a set of directed links (arcs) A: (N, A)

a primary bandwidth function pb: $A \rightarrow Z^+$ a backup bandwidth function bb: $A \rightarrow Z^+$ a selected failure node $e \in N$ the set of node pairs $B = \{(i,j) | (i,e) \in A \wedge (e,j) \in A \wedge i \neq j\}$ $\forall (i,j) \in B$ find
a backup path $P_{ij} = \langle (n_1, n_2), (n_2, n_3), \ldots, (n_{q_{ij}-1}, n_{q_{ij}}) \rangle$
where
the path starts at i and ends at j $n_1 = i$, $n_{q_{ij}} = j$, $q_{ij} \geq 2$
the path is a sequence of arcs $$\forall_{r, 1 \leq r < q_{ij}} (n_r, n_{r+1}) \in A$$

the path has no cycles $$\forall_{r,s: 1 \leq r < s \leq q_{ij}} n_r \neq n_s$$

the path does not pass through e $$\forall_{r,s: 1 \leq r < s \leq q_{ij}} n_r \neq e$$

such that the aggregate bandwidth used by the backup paths passing through any arc (k,m) does not exceed its backup bandwidth capacity. More formally:

Let $B^{km}$ be the subset of B, whose backup paths pass through (k,m):

$$B^{km} = \{(i,j) | (i,j) \in B \wedge (k,m) \in P_{ij}\}$$

Let $agg(B^{km})$ be the least upper bound on the aggregate bandwidth used by the backup paths passing through (k,m). We capture this formally by means of a maximization function.

For each $(i,j) \in B^{km}$, let $f_{ij}$ be a variable representing the traffic between i and j. If we maximize the aggregate flow $\Sigma f_{ij}$, subject to the relevant primary bandwidth limits, then we obtain the least upper bound for the aggregate flow passing through (k,m):

$$agg(B^{km}) = \text{MAX} \sum_{(i,j) \in B^{km}} f_{ij}$$

subject to $$\forall_{(i,j):(i,j) \in B^{km}} f_{ij} \geq 0$$

-continued $$\bigvee_{i:(i,j)\in B^{km}} \sum_{j:(i,j)\in B^{km}} f_{ij} \leq pb((i,e))$$

$$\bigvee_{j:(i,j)\in B^{km}} \sum_{i:(i,j)\in B^{km}} f_{ij} \leq pb((e,j))$$

Then the generated set of backup paths must satisfy:
$\forall (k,m)\in A$:

$$agg(B^{km}) \leq bb((k,m))$$

To further clarify the operation of aggregate bandwidth optimization, two worked examples will now be given.

Example 1

This example applies aggregate bandwidth optimization to the configuration of FIG. 2. The disrupted flows ABC and ABD are being diverted through the only available backup paths AEFC and AEFD. The least upper bound on the aggregate of the flows crossing EF is computed by solving the following maximization function:

$$agg(\{(ABC),(ABD)\}) = MAX f_{ABC} + f_{ABD}$$

subject to $$f_{ABC} \geq 0, f_{ABD} \geq 0$$

$$f_{ABC} + f_{ABD} \leq 15$$

$$f_{ABC} \leq 10, f_{ABD} \leq 10$$

By use of a linear programming solver such as Simplex, an optimizer obtains the solution: $agg(\{(ABC),(ABD)\})=15.0$, allocating the flow variables values that sum to this figure, for example $f_{ABC}=5.0$, and $f_{ABD}=10.0$.

Example 2

Figure 4:
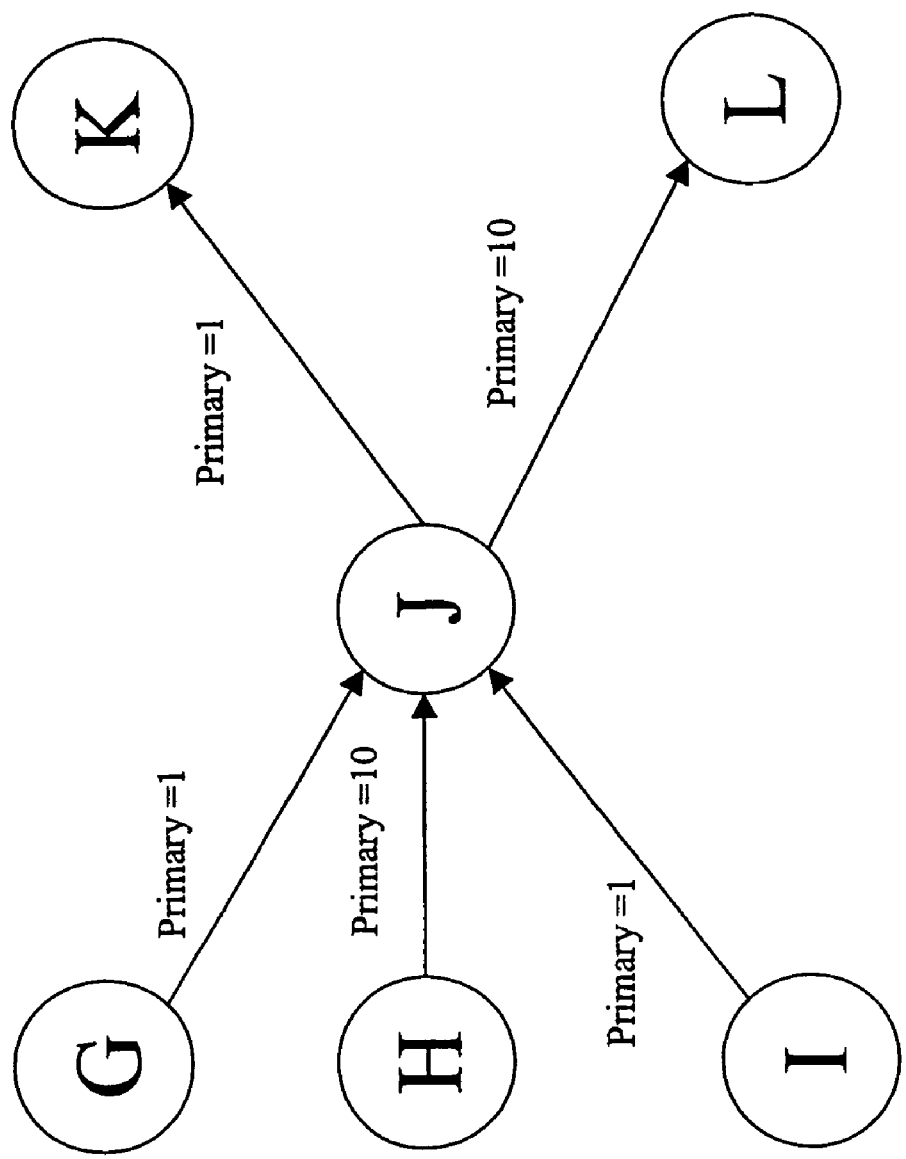
FIG. 4 depicts another network configuration useful in illustrating embodiments of the present invention.

The second example will be described with reference to the network depicted in FIG. 4. Node J is the node to be protected. Suppose there is a link MN (not shown) that serves as a part of backup tunnels protecting primary traffic flows GJK, HJK, and IJL. The backup bandwidth of MN need only be 2, since GJK and IJK, both traversing JK of unit capacity, can together take only 1 unit, while the third flow IJL requires a maximum capacity of 1.

The optimization problem is then:

$$agg(\{GJK,HJK,IJL\}) = MAX f_{GJK} + f_{HJK} + f_{IJL}$$

subject to $$f_{GJK} \geq 0, f_{HJK} \geq 0, f_{IJL} \geq 0$$

$$f_{GJK} \leq 1, f_{HJK} \leq 10, f_{IJL} \leq 1$$

$$f_{GJK} + f_{HJK_1} \geq 1, f_{IJL} \geq 10$$

By use of a linear programming solver, the solution $agg(\{GJK,HJK,IJL\})=2.0$ is obtained, with the optimizer allocating the flow variables compatible values, e.g. $f_{GJK}=0.0$, $f_{HJK}=1.0$, $f_{IJL}=1.0$.

An example procedure for placing guaranteed bandwidth backup tunnels using flow inference and aggregate bandwidth optimization will now be presented. The procedure is applied to each node protection case and is divided into two phases.

Phase 1:
1. B:=the set of primary traffic flows for the node e undergoing protection, as defined above: B={(i,j)|(i,e)∈A∧(e,j)∈A∧i≠j}
2. For every possible subset S of B, compute the value of agg(S) using a linear optimizer and store it.
3. Delete the node e and its adjacent links from the network representation to create a post-failure network, Net*.
4. For each remaining link (k,m) in the network, set $B^{km}=\{\}$.

Phase 2:
1. If B={ }
   a. then terminate with a success indicator
   b. otherwise continue.
2. Select from B an unprotected primary traffic flow, (i,j).
3. B:=B−{(i,j)}.
4. Look up, for every link (k,m) in the post-failure network Net*, the value of $agg(B^{km} \cup \{(i,j)\})$, where $B^{km}$ is a set that contains all the flows the algorithm has already protected by backup tunnels that pass through (k, m).
5. If there are any links where $agg(B^{km} \cup \{(i,j)\}) \geq bb((k,m))$ (i.e. the aggregate bandwidth requirements exceeds the available backup bandwidth on this link), delete these links from Net* to create a new network Net**.
6. Apply a shortest path algorithm to route a backup tunnel for this flow over the new network Net**.
7. If a route is found for the backup tunnel
   a. then
      i. associate the primary traffic flow with the backup tunnel generated
      ii. set $B^{km} = B^{km} \cup \{(i,j)\}$
   b. otherwise terminate with a failure indicator.
8. Go to 1.

It will be seen then that the use of the flow bandwidth inference and aggregate bandwidth optimization leads to a tighter bound on aggregate primary traffic flows, and therefore to more effective placement of backup tunnels. In many situations, guaranteed bandwidth protection will be provided where it would have been impossible if bounds had been computed by simply summing the upper bandwidth bounds inferred for individual primary traffic flows.

Figure 1:
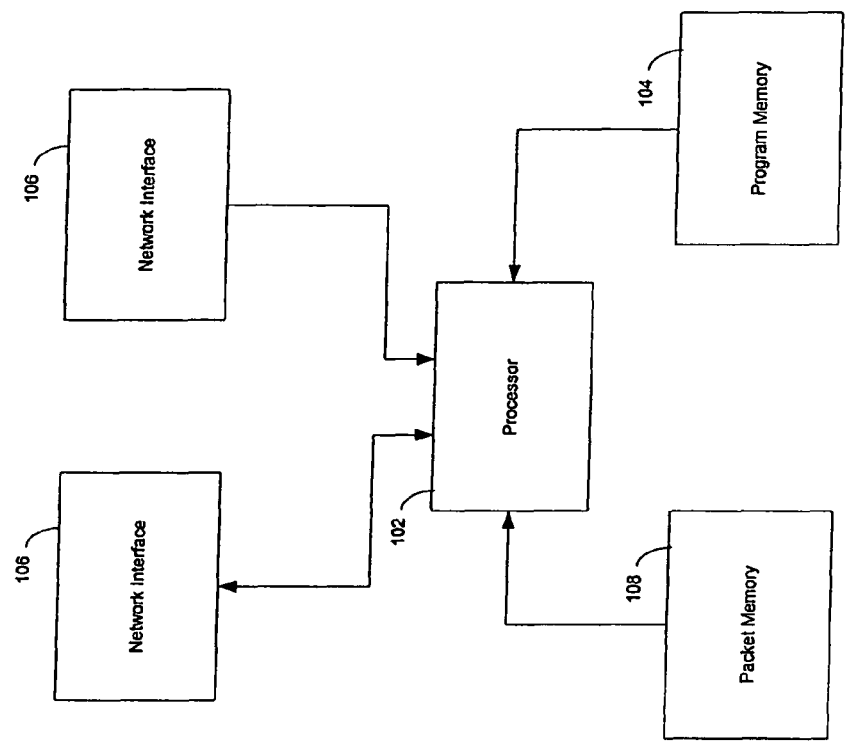
FIG. 1 depicts a computer system useful in implementing embodiments of the present invention.

FIG. 1 depicts a network device 100 that may be used to implement any of the nodes depicted in FIGS. 2-3 or a network management workstation. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory. Another form of computer-readable storage medium storing the same codes would be some type of non-volatile storage such as floppy disks, CD-ROMs, DVD-ROMs, hard disks, flash memory, etc.

Network device 100 interfaces with physical media via a plurality of network interfaces 106. For example, one of network interfaces 106 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces, etc. As packets are received, processed and forwarded by network device 100, they may be stored in a packet memory 108. Network device 100 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, in certain applications such as, e.g., where failure detection mechanisms cannot distinguish accurately between link and node failures, aggregate flows through a protected node will be understood to include primary traffic flows that terminate at the protected node.

The invention claimed is:

1. In a data communication network, a method for deducing an upper bound on an aggregate flow that passes through a node undergoing protection that is tighter than that obtained by summing upper bandwidth bounds of individual flows contributing to said aggregate flow, said method comprising:
   inspecting primary bandwidth capacities of links adjoining said node undergoing protection; and
   exploiting at a network device, knowledge that said capacities are known to limit maximum bandwidth of said aggregate flow;
   wherein exploiting knowledge comprises defining constraints on said aggregate flow, said constraints comprising:
   all of said individual flows have bandwidth greater than or equal to zero;
   for all nodes adjoining said protected node, a sum of bandwidths of flows leaving the adjoining node is less than or equal to a primary bandwidth of the link connecting the adjoining node and said protected node; and
   for all nodes adjoining said protected node a sum of bandwidths of flows arriving at the adjoining node is less than or equal to a primary bandwidth of the link connecting the adjoining node and said protected node.

2. The method of claim 1 wherein exploiting knowledge comprises:
   invoking a linear programming procedure.

3. The method of claim 1 wherein said aggregate flow comprises:
   primary traffic flowing through a protected node of said network.

4. The method of claim 3 wherein individual flows of said aggregate flow correspond to link pairs traversing said protected node.

5. The method of claim 1 wherein primary bandwidth of a link is defined as maximum bandwidth reservable for primary label switched paths (LSPs).

6. The method of claim 1 wherein said network comprises an MPLS Traffic Engineering network.

7. A computer program embodied in a computer-readable storage medium, said computer program comprising:
   code that deduces an upper bound on an aggregate flow that passes through a node undergoing protection that is tighter than that obtained by summing upper bandwidth bounds of individual flows contributing to said aggregate flow, by inspecting primary bandwidth capacities of links adjoining said node undergoing protection and exploiting knowledge that said capacities are known to limit maximum bandwidth of said aggregate flow;
   wherein code that deduces an upper bound comprises code that defines constraints on said aggregate flow, said constraints comprising:
   all of said individual flows have bandwidth greater than or equal to zero;
   for all nodes adjoining said protected node, a sum of bandwidths of flows leaving the adjoining node is less than or equal to a primary bandwidth of the link connecting the adjoining node and said protected node; and
   for all nodes adjoining said protected node a sum of bandwidths of flows arriving at the adjoining node is less than or equal to a primary bandwidth of the link connecting the adjoining node and said protected node.

8. The computer program of claim 7 wherein said code that deduces an upper bound comprises:
   code that invokes a linear programming procedure.

9. The computer program of claim 7 wherein said aggregate flow comprises:
   primary traffic flowing through a protected node of said network.

10. The computer program of claim 7 wherein individual flows of said aggregate flow correspond to link pairs traversing said protected node.

11. The computer program of claim 7 wherein primary bandwidth of a link is defined as maximum bandwidth reservable for primary label switched paths (LSPs).

12. The computer program of claim 7 wherein said network comprises an MPLS Traffic Engineering network.

13. Apparatus for use in a data communication network, said apparatus comprising:
   a processor; and
   a computer-readable storage medium, said computer-readable storage medium having stored thereon:
   code that deduces an upper bound on an aggregate flow that passes through a node undergoing protection that is tighter than that obtained by summing upper bandwidth bounds of individual flows contributing to said aggregate flow, by inspecting primary bandwidth capacities of links adjoining said node undergoing protection, and exploiting knowledge that said capacities are known to limit maximum bandwidth of said aggregate flow under consideration;
   wherein code that deduces an upper bound comprises code that defines constraints on said aggregate flow, said constraints comprising:
   all of said individual flows have bandwidth greater than or equal to zero;
   for all nodes adjoining said protected node, a sum of bandwidths of flows leaving the adjoining node is less than or equal to a primary bandwidth of the link connecting the adjoining node and said protected node; and
   for all nodes adjoining said protected node a sum of bandwidths of flows arriving at the adjoining node is less than or equal to a primary bandwidth of the link connecting the adjoining node and said protected node.

14. The apparatus of claim 13 wherein said network comprises an MPLS Traffic Engineering network.

15. The apparatus of claim 13 wherein said code that deduces an upper bound comprises:
   code that invokes a linear programming procedure.

16. The apparatus of claim 13 wherein said aggregate flow comprises:
   primary traffic flowing through a protected node of said network.

17. The apparatus of claim 13 wherein individual flows of said aggregate flow correspond to link pairs traversing said protected node.

18. The apparatus of claim 13 wherein primary bandwidth of a link is defined as maximum bandwidth reservable for primary label switched paths (LSPs).

* * * * *

UNITED STATES PATENT AND TRADEMARK OFFICE
CERTIFICATE OF CORRECTION

| | | |
|---|---|---|
| PATENT NO. | : 7,848,249 B1 | Page 1 of 1 |
| APPLICATION NO. | : 12/218308 | |
| DATED | : December 7, 2010 | |
| INVENTOR(S) | : Anna Charny, Hani El-Sakkout and Barry Richards | |

It is certified that error appears in the above-identified patent and that said Letters Patent is hereby corrected as shown below:

Title page item (63), should read:

Related U.S. Application Data

Division of application No. 10/262,296, filed on Sep. 30, 2002, now Pat. No. 7,418,493.

Signed and Sealed this
Eighth Day of February, 2011

David J. Kappos
*Director of the United States Patent and Trademark Office*